United States Patent
Baumhauer et al.

(10) Patent No.: US 8,226,367 B2
(45) Date of Patent: Jul. 24, 2012

(54) MOVABLE IMPELLER FOR A TURBOJET AND TURBOJET COMPRISING SAME

(75) Inventors: Stephane Jean Joseph Baumhauer, Massy (FR); Jerome Alain Dupeux, Vaux le Penil (FR); Francois Maurice Garcin, Paris (FR); Jean-Pierre Francois Lombard, Pamfou (FR); Eric Seinturier, Bruges (FR); Etienne Balmes, Paris (FR)

(73) Assignee: SNECMA, Paris (FR)

( * ) Notice: Subject to any disclaimer, the term of this patent is extended or adjusted under 35 U.S.C. 154(b) by 1065 days.

(21) Appl. No.: 12/144,994

(22) Filed: Jun. 24, 2008

(65) Prior Publication Data

US 2009/0004021 A1    Jan. 1, 2009

(30) Foreign Application Priority Data

Jun. 26, 2007  (FR) ...................... 07 04581

(51) Int. Cl.
*F01D 5/14* (2006.01)
(52) U.S. Cl. .................................. 416/229 R
(58) Field of Classification Search .......... None
See application file for complete search history.

(56) References Cited

U.S. PATENT DOCUMENTS

| 4,784,012 A |   | 11/1988 | Marra |
| 4,817,455 A |   | 4/1989 | Buxe |
| 5,205,713 A | * | 4/1993 | Szpunar et al. ........... 416/193 A |
| 5,356,264 A | * | 10/1994 | Watson et al. ............. 415/119 |
| 6,102,664 A | * | 8/2000 | Nguyen ....................... 416/248 |
| 6,287,664 B1 | * | 9/2001 | Pratt .............................. 428/68 |
| 6,494,679 B1 | * | 12/2002 | Gadre et al. ................. 416/145 |

FOREIGN PATENT DOCUMENTS

| EP | 1 074 762 A2 | 2/2001 |
| EP | 1 180 579 A2 | 2/2002 |
| FR | 2 888 876 | 1/2007 |
| WO | WO 99/43955 | 9/1999 |

OTHER PUBLICATIONS

U.S. Appl. No. 12/144,960, filed Jun. 24, 2008, Baumhauer, et al.
U.S. Appl. No. 12/145,085, filed Jun. 24, 2008, Baumhauer, et al.
U.S. Appl. No. 12/209,537, filed Sep. 12, 2008, Le Hong, et al.
U.S. Appl. No. 12/207,009, filed Sep. 9, 2008, Garcin, et al.

* cited by examiner

*Primary Examiner* — Alexander Sofocleous
*Assistant Examiner* — Harry W Byrne
(74) *Attorney, Agent, or Firm* — Oblon, Spivak, McClelland, Maier & Neustadt, L.L.P.

(57) ABSTRACT

An impeller including a blade, a support of the blade which extends substantially radially, at least one intermediate part extending, in a substantially axial direction, between the blade and the support of the blade, and at least one damping device placed on at least one face of the intermediate part is disclosed. The damping device is segmented in an axial and/or circumferential direction into at least two elementary damping devices.

17 Claims, 5 Drawing Sheets

MOVABLE IMPELLER FOR A TURBOJET AND TURBOJET COMPRISING SAME

The present invention relates to the field of the damping of parts, more particularly the damping of movable impellers in a turbojet.

Its subject is a movable impeller and a turbojet comprising such a movable impeller.

In all that follows, the terms "axial" and "radial" correspond respectively to an axial direction and a radial direction of the turbojet.

A turbojet comprises sets of movable impellers and sets of fixed impellers. The movable impellers conventionally consist of disks and blades fitted to these disks, or else consist of monobloc bladed disks (DAM), or else consist of monobloc bladed rings (ANAM).

During the operation of a turbojet, the parts forming it may be subjected to dynamic stresses whose repercussions can cause damage. The parts must be dimensioned so as to respond to the imperatives of aerodynamic, aeroacoustic performance, and of mechanical resistance to temperature and aerodynamic load, and if necessary to rotation. The aeroelastic coupling, that is to say the coupling between the dynamics of the impellers and the fluid flow, also affects the vibratory stability of the parts. It is therefore necessary for the parts to be subjected to amplitudes of vibratory stresses that remain small.

One objective sought by the manufacturers and users of turbojets is to limit the vibrations in the blades of the movable impellers.

When the movable impellers comprise blades fitted to the disks, there is a possibility of energy dissipation by friction at the connections between these disks and these blades. On the other hand, for movable impellers of the monobloc bladed disk type (DAM) or the monobloc bladed rings (ANAM), on which the blades are made monobloc with the disks, this energy dissipation by friction cannot take place. The vibratory levels of the blades therefore remain higher.

To overcome this disadvantage, it has been proposed to fit the blades with damping means, in order to reduce the effects of the vibrations to which they are subjected. Document EP 1 253 290 proposes fitting the profile of the blades with a damping means comprising a layer of viscoelastic material and a stress layer. Since the profile of the blades is in the stream of gas flow, the solution put forward in this document proposes hollowing out a notch in the profile of the blades, in order to house the damping means therein. The surface of the blade profiles in contact with the flow therefore does not present an irregularity and the gas flow is not disrupted. Such an arrangement however has other disadvantages. Specifically, it is necessary to machine each blade profile to produce the notch for receiving the damping means. This machining operation is awkward because the blade is thin. In addition, in the case of a movable impeller, if the machining operation and/or the dimensions of the damping means are not identical from one blade to the other, there is a risk of general imbalance of the impeller, which may result in unbalance during the operation of the turbojet. All these constraints associated with the machining operation increase the part manufacturing times and costs.

The object of the invention is to solve the general problem associated with the vibrations of the blades of the movable impellers of a turbojet. The invention proposes a solution that differs from that proposed in document EP 1 253 290, avoiding the disadvantages associated with this solution of the prior art.

According to a first aspect, the invention relates to a movable impeller, such as in a turbojet, comprising in particular a plurality of blades and their support, which extend substantially radially. According to the invention, said impeller comprises at least one intermediate part extending, in a substantially axial direction, from the blade support, and at least one damping means placed on at least one face of said intermediate part.

According to one embodiment, the damping means totally covers said face of the intermediate part. According to another embodiment, the damping means covers it partially.

The damping means comprises at least one layer of viscoelastic material and at least one counterlayer of rigid material. The layer of viscoelastic material and the counterlayer of rigid material are attached to one another, for example by means of an adhesive material. Particularly, the damping means comprises several layers of viscoelastic material and several counterlayers of rigid material that are placed alternately.

The layers of viscoelastic material have either all the same mechanical characteristics or different mechanical characteristics.

Furthermore, the counterlayers of rigid material have either all the same mechanical characteristics or different mechanical characteristics.

The damping means is segmented in an axial direction into at least two elementary damping means and/or is segmented in a circumferential direction into at least two elementary damping means.

The intermediate part on which a damping means is placed has either a constant thickness or a zone of nonconstant thickness. According to the latter embodiment, the nonconstant thickness zone has a thickness that increases in an axial direction, from its edge closest to the support to its edge furthest from the blade support. According to a variant of this embodiment, the nonconstant thickness zone has a thickness that increases in an axial direction, from its edge furthest from the blade support to its edge closest to the latter. According to a variant of this embodiment, the nonconstant thickness zone has a thickness that increases in an axial direction, from its center to its edge furthest from the blade support and to its edge furthest from the latter. According to another variant of this embodiment, the nonconstant thickness zone has a thickness that increases in an axial direction and in a circumferential direction.

According to another embodiment, the intermediate part comprises one end connected to said support and the damping means comprises a main portion that is placed on said intermediate part and a lateral portion that is placed on a substantially radial face of said support. According to another embodiment, said intermediate part comprises one end connected to an end flange, and the damping means comprises a main portion that is placed on said intermediate part and a lateral portion that is placed on a substantially radial face of said end flange. According to one or other of these two embodiments, said main portion and said lateral portion are connected by a connecting portion forming a beam.

According to a variant of these two embodiments, said intermediate part comprises one end connected to said support and another end connected to an end flange, and the impeller comprises a first damping means comprising a first main portion that is placed on said intermediate part and a first lateral portion that is placed on a substantially radial face of said support, said first main portion and first lateral portion being connected by a first connecting portion forming a beam, and the impeller comprises a second damping means comprising a second main portion that is placed on the first main portion and a second lateral portion that is placed on a substantially radial face of said end flange, said second main portion and second lateral portion being connected by a second connecting portion forming a beam.

According to a variant that differs from the foregoing, said intermediate part comprises one end connected to said support and another end connected to an end flange, and the impeller comprises a first damping means comprising a first main portion that is placed on said intermediate part and a first lateral portion that is placed on a substantially radial face of said end flange, said first main portion and first lateral portion being connected by a first connecting portion forming a beam, and the impeller comprises a second damping means comprising a second main portion that is placed on the first main portion and a second lateral portion that is placed on a substantially radial face of said support, said second main portion and second lateral portion being connected by a second connecting portion forming a beam.

According to one embodiment, the impeller comprises a damping means placed on an inner face of said intermediate portion. According to another embodiment, the impeller comprises a damping means placed on an outer face of said intermediate part.

According to a second aspect, the invention relates to a movable impeller of the type comprising a disk or a ring supporting blades, particularly for a turbojet, wherein said intermediate part is a collar of the disk or of the ring and wherein at least one damping means is placed on an inner face of said collar.

According to another aspect, the invention relates to a turbojet which comprises at least one movable impeller.

Therefore, unlike the solution of document EP 1 253 290, a damping means is placed not on the blades themselves, but on the disks or on the rings and more particularly on the collars of the disks or rings. With the solution provided by the invention, the vibratory damping of the blades is obtained indirectly after obtaining a vibratory damping of the disk or of the ring supporting the blades. Those skilled in the art would not have been naturally led to this other solution, because the present invention does not have the disadvantages mentioned above of the solution recommended in document EP 1 253 290, associated with the machining operations on the blades. The compromise between the level of vibratory damping and the removal of the disadvantages associated with the prior art solution is acceptable for certain operating conditions of the turbojet.

Another advantage of the solution of the present invention lies in the fact that it is not necessary to machine the parts to house the damping means. Consequently, the manufacture of the impellers is carried out more rapidly and at less cost. In addition, the risks of unbalance are reduced.

Another advantage of the solution of the present invention lies in the fact that the damping means are placed on the collars of the disks or of the rings of the impellers. Because these collars are not in the gas flow stream, it is not necessary to machine them in order to create housings therein for the damping means.

Another advantage of the solution of the present invention lies in the fact that it is possible to fit new impeller models with the damping means of the invention, but also the old models of impellers, without having to carry out a structural modification thereof.

The invention will be better understood on reading the following detailed description of particular embodiments of the invention, provided as an indication and in no way limiting, and illustrated by means of the appended drawings in which.

Figure 1:
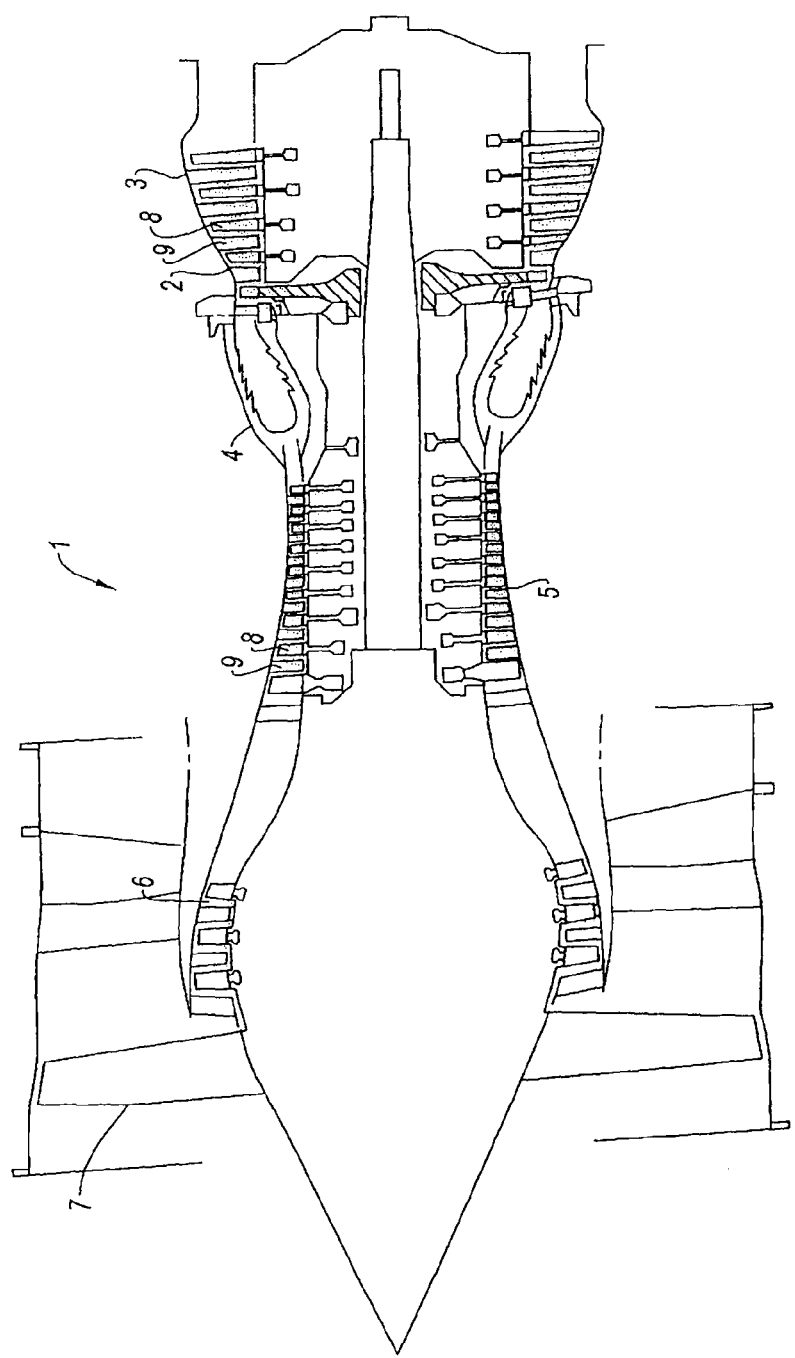
FIG. 1 represents schematically and in axial section a turbojet comprising impellers according to the invention.

With reference first of all to FIG. 1, this shows schematically a turbojet 1, comprising a high-pressure turbine 2, a low-pressure turbine 3, a combustion chamber 4, a high-pressure compressor 5, a low-pressure compressor 6 and a fan 7. The turbojet 1 comprises movable impellers 8 and fixed impellers 9 forming part, for example, of the high-pressure turbine 2 or of the low-pressure turbine 3 or of the high-pressure compressor 5.

Figure 2:
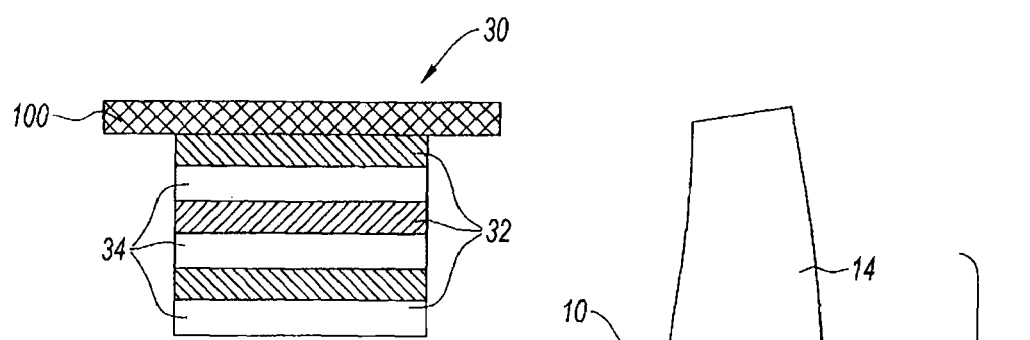
FIG. 2 represents, in section, a damping means according to the invention.

FIG. 2 represents a damping means 30 according to the invention placed on a part 100. The damping means 30 is shown substantially in the form of a multilayer stack. According to one embodiment, it comprises a layer 32 of a viscoelastic material and a counterlayer 34 of a rigid material. "Rigid material" means a material that is more rigid than the viscoelastic material of the layer 32. According to other embodiments, the damping means 30 comprises several layers 32 of viscoelastic material and several counterlayers 34 of rigid material that are placed alternately. The example illustrated in FIG. 2 shows, in a nonlimiting manner, a damping means 30 having three layers 32 of viscoelastic material and three counterlayers 34 of rigid material. Preferably, the layer(s) 32 of viscoelastic material and the counterlayer(s) 34 of rigid material have equal dimensions. When the damping means 30 comprises several layers 32 of viscoelastic material, the latter may have all the same mechanical characteristics, or else have different mechanical characteristics. When the damping means 30 comprises several counterlayers 34 of rigid material, the latter may have all the same mechanical characteristics, or else have different mechanical characteristics. The damping means 30 is attached to the part 100 by adhesion by means of a film of adhesive or by polymerization. The layers 32 of viscoelastic material and the layers 34 of rigid material are attached to one another also by adhesion, by means of a film of adhesive or by polymerization.

Figure 3:
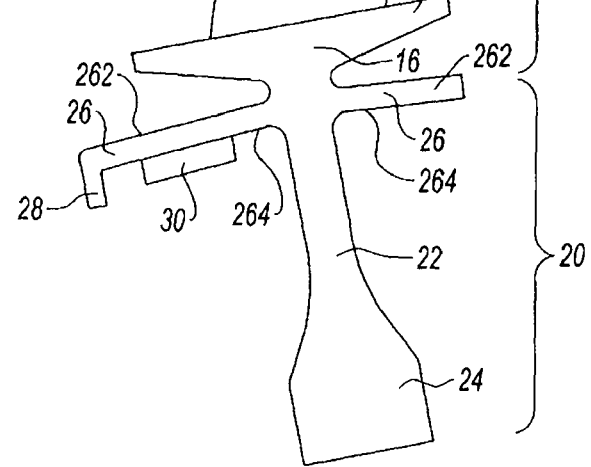
FIG. 3 represents schematically and in axial section a movable impeller, of the monobloc bladed disk type, fitted with a damping means according to the invention.

FIG. 3 shows in semi axial section a movable impeller 8 of the monobloc bladed disk type fitted with a damping means 30. In conventional manner, the impeller 10 comprises a blade 12 itself formed of an air foil 14 and a blade root 16 which extend respectively on either side of a platform 18 in a radial direction. The impeller also comprises a disk 20, formed of a blade support 22, which in this instance is a disk spider, said support 22 terminating radially inward via a hub 24. Between the blade support 22 and the blade root 16, the disk 20 comprises two collars 26, extending on either side of said support 22 in a substantially axial direction. At least one of these collars 26 comprises, on an end opposite to the support 22, an end flange 28 for attachment of said collar 26 to an adjacent part (not shown). Each collar 26 has an outer face 262 and an inner face 264. A damping means 30 is attached to the inner face 264 of at least one of the collars 26. During the operation of the turbojet 1, the centrifugal force resulting from rotation of the movable impeller 8 has the effect of flattening the damping means 30 against the inner face 264 of the collar 26, which reinforces the adhesion of the damping means 30 to the collar 26. This is why it is preferable that the damping means 30 be placed on the inner face 264 of said collar 26 for a movable impeller 8.

The damping effect procured by a damping means such as that shown in FIG. 2 result from shearing stresses inside each layer 32 of viscoelastic material. This shearing causes a dissipation of energy at each layer 32 of viscoelastic material. Therefore, the effects of the vibratory stresses that are applied to the disks and/or the rings 20 are damped. The effects of the vibratory stresses that are applied to the blades 12 are also damped, indirectly. Because the damping of the vibratory modes of the blades 12 arises from the damping of the vibratory modes of the disk, it is possible to prevent a transmission of vibratory energy from one blade to the other, which is an additional advantage of the invention.

The detailed description that follows relates to an application of the invention to a movable impeller 8, consisting of a monobloc bladed disk, for which the intermediate part 26 is a collar of the disk 20 and for which the blade support 22 is a spider of the disk 20.

Figure 8:
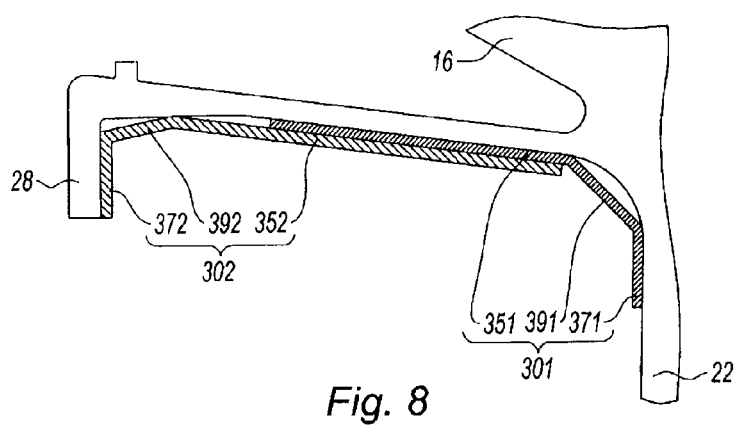
Figure 9:
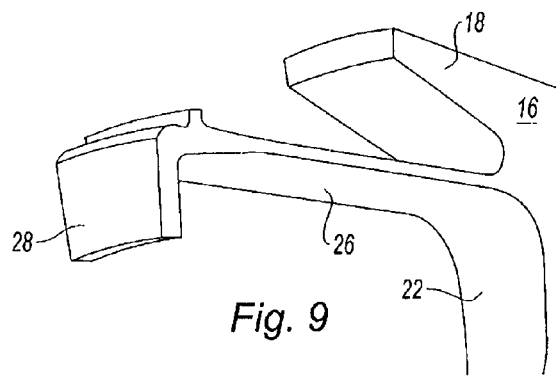
FIG. 9 is a partial view, in perspective, of a movable impeller, of the monobloc bladed disk type, having a collar according to one form of the invention.

FIG. 9 represents, in perspective and on an enlarged scale, an impeller portion in the shape of a sector showing a collar 26 which has a substantially constant thickness. FIGS. 5 to 8 represent several embodiments of the movable impeller 8, for which the collars 26 have a substantially constant thickness and are fitted with damping means 30.

Figure 5:
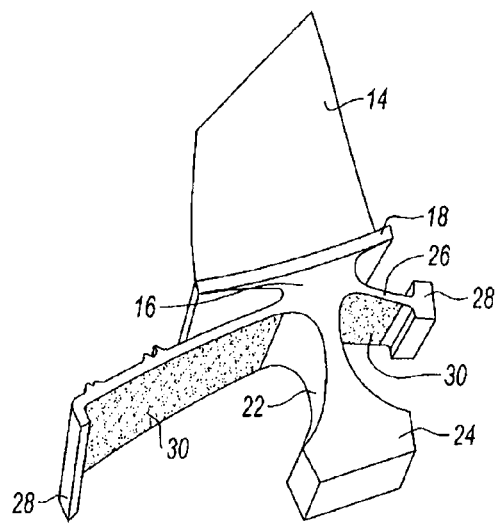
FIG. 5 is a view in perspective of a movable impeller, of the monobloc bladed disk type, fitted with a damping means according to one form of the invention.

FIG. 5 illustrates an embodiment of the invention in which the inner face 264 of each of the two collars 26 is totally covered by a damping means 30. More particularly, the working portion of this damping means is defined relative to the vibration mode, that is to say that which deforms the most in this vibration mode.

Figure 6:
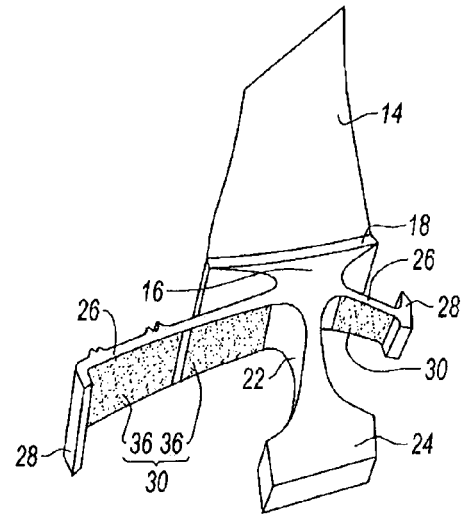
FIGS. 6 to 8 are views in perspective of a movable impeller, of the monobloc bladed disk type, fitted with a damping means according to other forms of the invention.

FIG. 6 illustrates another embodiment of the invention, in which the inner face 264 of one of the collars 26 receives a damping means 30 which is segmented in the axial direction into two elementary damping means 36. Such an arrangement has the advantage of easier installation than the previous arrangement.

Figures 7, 13:
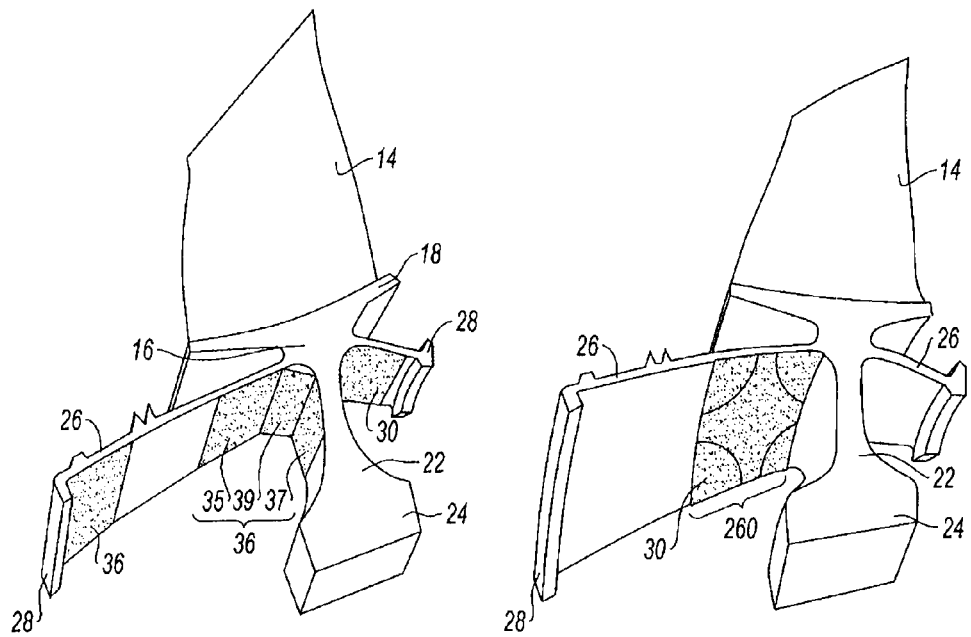
FIG. 13 is a view in perspective of a movable impeller, of the monobloc bladed disk type, fitted with a damping means according to yet another form of the invention.

FIG. 7 illustrates yet another embodiment of the invention, in which the inner face 264 of one of the collars 26 (on the right in FIG. 7) is totally covered by a damping means 30, while the inner face 264 of the other collar 26 (on the left in FIG. 7) is fitted with a damping means 30 that is segmented in an axial direction into two elementary damping means 36.

One of these elementary means 36 comprises a main portion 35, a lateral portion 37 and a connecting portion 39. The main portion 35 partially covers said inner face 264, close to the spider 22. The lateral portion 37 partially covers a substantially radial face of the spider 22, close to said inner face 264. The connecting portion 39 connects said main portion 35 and said lateral portion 37. Because of the presence of one or more rigid counterlayers 34, the connecting portion 39 is not pressed onto the impeller zone 10 that is at the junction between the collar 26 and the spider 22. This connecting portion 39 extends between the main portion 35 and the lateral portion 37 substantially having a beam or bridge shape.

The other elementary damping means 36 of this collar 26 (on the left in FIG. 7) comprises a main portion 35, a lateral portion 37 and a connecting portion 39. The main portion 35 partially covers said inner face 264, close to an end flange 28 of the collar 26. The lateral portion 37 partially covers a substantially radial face of said end flange 28, close to said inner face 264. The connecting portion 39 connects said main portion 35 and said lateral portion 37 and has substantially a beam or bridge shape.

FIG. 8 illustrates, in axial section, yet another embodiment of the invention, that is a variant of the embodiment shown in FIG. 7. The inner face 264 of the collar 26 is covered by a first damping means 301 and a second damping means 302 which are both of the type having a main portion 351, 352, a lateral portion 371, 372 and a connecting portion 391, 392. These two damping means 301, 302 are superposed and opposed. In other words, the main portion 351 of the first damping means 301 is attached to the inner face 264 of the collar 26 and the main portion 352 of the second damping means 302 is attached to the main portion 351 of the first damping means 301. One of them has its lateral portion 371 placed on a substantially radial face of the spider 22 adjacent to said inner face 264, while the other has its lateral portion 372 placed on a substantially radial face of the end flange 28 adjacent to said inner face 264. In the other example illustrated in FIG. 8, the damping means 301, which is attached directly to the inner face 264 of the collar 26 is the one whose lateral portion 371 is placed on the radial face of the spider 22. In another variant (not shown), the damping means that is directly attached to the inner face of the collar is the one whose lateral portion is placed on the radial face of the end flange.

FIGS. 4 and 10 to 14 represent several embodiments of a movable impeller 8, for which at least one of the collars 26 has a nonconstant thickness zone 260, designed to receive a damping means 30.

Figure 10:
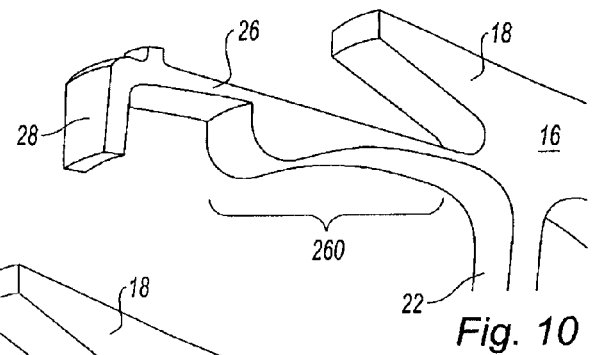
FIGS. 10 to 12 are partial views, in perspective, of a movable impeller, of the monobloc bladed disk type, having a collar according to other forms of the invention.

In FIG. 10, the thickness of the collar 26 increases on its inner face 264, in an axial direction, from its edge closest to the spider 22 to its edge furthest from the spider 22.

Figure 11:
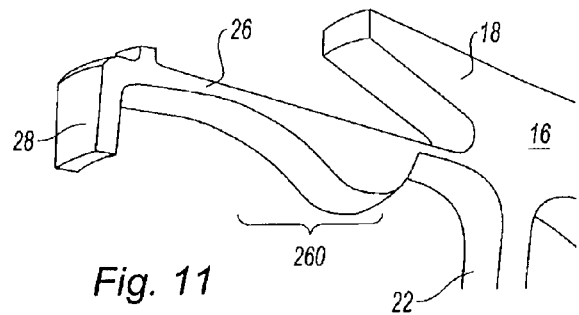

In FIG. 11, the thickness of the collar 26 increases on its inner face 264, in an axial direction, from its edge furthest from the spider 22 to its edge closest to the spider 22.

Figure 12:
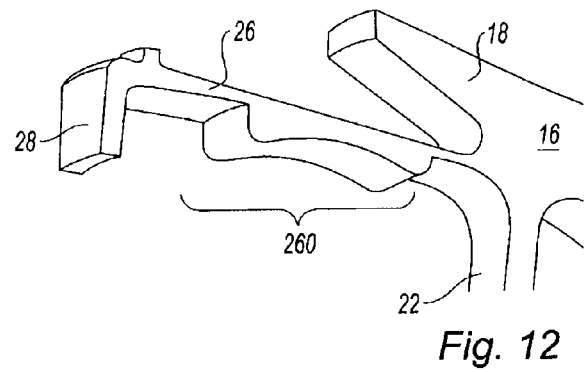

In FIG. 12, the thickness of the collar 26 increases on its inner face 264, in an axial direction, from its center to its edge furthest from the spider 22 and to its edge furthest from the spider 22.

In FIG. 13, the thickness of the collar 26 increases on its inner face 264, in an axial direction and in a circumferential direction. The nonconstant thickness zone 260 is presented as a substantially rectangular zone whose corners have a thickness that is increased relative to the rest of the surface of said zone.

Figure 14:
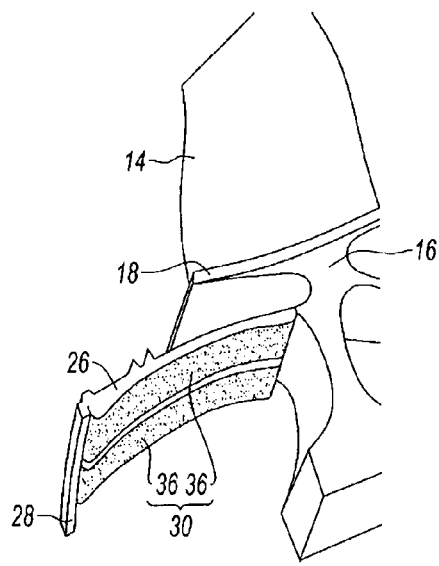
FIG. 14 is a partial view, in perspective, of a movable impeller, of the monobloc bladed disk type, fitted with a damping means according to another embodiment.
Figure 4:
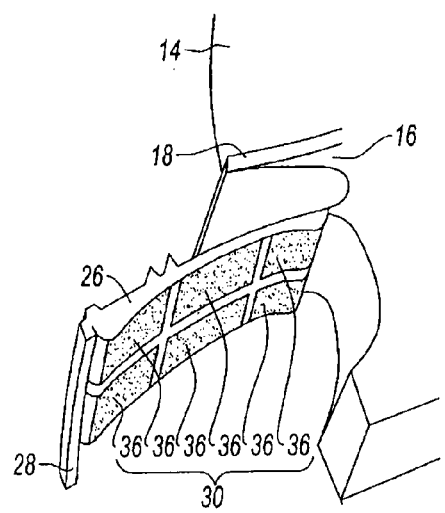
FIG. 4 is a partial view, in perspective, of a movable impeller, of the monobloc bladed disk type, fitted with a damping means according to another embodiment.

In FIGS. 10 to 12, the nonconstant thickness zone 260 corresponds to a portion of the collar 26. But this nonconstant thickness zone 260 may also correspond to the totality of the collar 26, as is the case for the embodiments illustrated in FIGS. 4 and 14. In these two figures, the nonconstant thickness zone 260 of the collar 26 increases on its inner face 264, in an axial direction, from its center to its edge furthest from the spider 22 and to its edge furthest from the spider 22. FIG. 14 shows a damping means 30 that is segmented in the circumferential direction into two elementary damping means 36. FIG. 4 shows a damping means 30 which is segmented twice in the axial direction and once in the circumferential direction into six elementary damping means 36.

The invention is not limited to the embodiments that have just been described but also covers their combinations. For example, it is possible to envisage a collar of constant thickness having a damping means totally covering its inner face, or else partially covering said inner face. In one case or the other, the damping means may be made in a single piece, or it may be segmented one or more times in the axial direction, or else it may be segmented one or more times in the circumferential direction, or else it may be segmented one or more times in each of the two axial and circumferential directions. In addition, in a manner cumulated with all the foregoing cases, the damping means may be placed only on the inner face of the collar or else it may be a three-portion means having a lateral portion placed on a radial face of the disk or on a radial face of an end flange.

The invention is not limited to a movable impeller of the monobloc bladed disk type. It also applies to a movable impeller of the type having blades fitted to a separate disk.

The invention claimed is:

1. A movable impeller of a turbomachine comprising:
    a plurality of blades, each blade including an air foil and a blade root;
    a disk including a hub and an axisymmetric support of the blades that extends substantially radially;
    at least one intermediate part disposed radially below the blade and extending in a substantially axial direction from the support; and
    at least one damping means placed on at least one face of the intermediate part, said damping means comprising at least one layer of viscoelastic material and at least one counterlayer of rigid material,
    wherein the damping means is segmented in an axial and/or circumferential direction into at least two elementary damping means.

2. The movable impeller as claimed in claim 1, wherein the damping means at least partially covers said face of the intermediate part.

3. The movable impeller as claimed in claim 1, wherein the layer of viscoelastic material and the counterlayer of rigid material are attached to one another.

4. The movable impeller as claimed in claim 1, wherein the damping means comprises several layers of viscoelastic material and several counterlayers of rigid material that are placed alternately.

5. The movable impeller as claimed in claim 4, wherein at least a portion of the layers of viscoelastic material have different mechanical characteristics.

6. The movable impeller as claimed in claim 4 or 5, wherein at least a portion of the counterlayers of rigid material has different mechanical characteristics.

7. The movable impeller as claimed in claim 1, wherein the intermediate part comprises a zone of nonconstant thickness on which is placed the damping means, said thickness increases in an axial direction, from its edge closest to said support to its edge furthest from said support, or else increases in an axial direction, from its edge furthest from said support to its edge closest to said support or else increases in an axial direction, from its center to its edge furthest from said support and to its edge furthest from said support or else increases in an axial direction and in a circumferential direction.

8. The movable impeller as claimed in claim 1, wherein the intermediate part comprises an end connected to said support and the damping means comprises a main portion that is placed on said intermediate part and a lateral portion that is placed on a substantially radial face of said support.

9. The movable impeller as claimed in claim 1, wherein said intermediate part comprises an end connected to an end flange, and wherein the damping means comprises a main portion that is placed on said intermediate part and a lateral portion that is placed on a substantially radial face of said end flange.

10. The movable impeller as claimed in claim 8 or claim 9, wherein said main portion and said lateral portion are connected by a connecting portion forming a beam.

11. The movable impeller as claimed in claim 1, wherein said intermediate part comprises one end connected to said support of the blade and another end connected to an end flange, and
    the movable impeller comprises:
        a first damping means comprising a first main portion that is placed on said intermediate part and a first lateral portion that is placed on a substantially radial face of said support, said first main portion and first lateral portion being connected by a first connecting portion forming a beam, and
        a second damping means comprising a second main portion that is placed on the first main portion and a second lateral portion that is placed on a substantially radial face of said end flange, said second main portion and second lateral portion being connected by a second connecting portion forming a beam.

12. The movable impeller as claimed in claim 1, wherein said intermediate part comprises one end connected to said support of the blade and another end connected to an end flange, and
    the movable impeller comprises:
        a first damping means comprising a first main portion that is placed on said intermediate part and a first lateral portion that is placed on a substantially radial face of said end flange, said first main portion and first lateral portion being connected by a first connecting portion forming a beam, and
        a second damping means comprising a second main portion that is placed on the first main portion and a second lateral portion that is placed on a substantially radial face of said support, said second main portion and second lateral portion being connected by a second connecting portion forming a beam.

13. The movable impeller as claimed in claim 1, comprising a damping means placed on an inner face of said intermediate part or else on an outer face of said intermediate part.

14. A movable impeller, of the type comprising a disk or a ring supporting blades as claimed in claim 1, wherein said intermediate part is a collar of the disk or of the ring.

15. A turbojet comprising at least one impeller as claimed in claim 1.

16. The movable impeller as claimed in claim 1, wherein the movable impeller is a monobloc bladed disk.

17. The movable impeller as claimed in claim 3, wherein the layer of viscoelastic material and the counterlayer of rigid material are attached to one another by an adhesive.

* * * * *